United States Patent
Rao et al.

(10) Patent No.: US 12,536,060 B2
(45) Date of Patent: Jan. 27, 2026

(54) TECHNIQUES FOR MITIGATING ERRORS TIED TO SOFTWARE APPLICATIONS

(71) Applicant: Apple Inc., Cupertino, CA (US)

(72) Inventors: Madhusudan Rao, Dublin, CA (US); Kenneth I. Cohen, San Francisco, CA (US); Nora J. Shoemaker, Mountain View, CA (US); Victoria L. Shurman, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 52 days.

(21) Appl. No.: 18/479,036

(22) Filed: Sep. 30, 2023

(65) Prior Publication Data

US 2024/0311220 A1    Sep. 19, 2024

Related U.S. Application Data

(60) Provisional application No. 63/491,027, filed on Mar. 17, 2023.

(51) Int. Cl.
  *G06F 11/00* (2006.01)
  *G06F 11/07* (2006.01)
  (Continued)

(52) U.S. Cl.
  CPC ........ *G06F 11/0766* (2013.01); *G06F 11/302* (2013.01); *G06F 21/53* (2013.01)

(58) Field of Classification Search
  CPC ..... G06F 21/53; G06F 11/302; G06F 11/0766
  See application file for complete search history.

(56) References Cited

U.S. PATENT DOCUMENTS

| 7,970,705 B2 | 6/2011 | Patterson |
| 8,095,464 B2 | 1/2012 | Patterson et al. |

(Continued)

FOREIGN PATENT DOCUMENTS

| JP | 2016143396 A | 8/2016 |
| WO | 2018225492 A1 | 12/2018 |

OTHER PUBLICATIONS

European Patent Application 24159763.2—Extended European Search Report dated Jul. 8, 2024.

(Continued)

*Primary Examiner* — Jonathan D Gibson
(74) *Attorney, Agent, or Firm* — DICKINSON WRIGHT RLLP

(57) ABSTRACT

Disclosed herein is a technique for mitigating errors tied to software applications. According to some embodiments, the technique can be implemented by a server device, and include the steps of (1) identifying at least one error associated with a user of a software application, (2) identifying at least one client device associated with the user and on which the software application is installed, and (3) providing, to the at least one client device, an indication of the at least one error to cause the software application to, in conjunction with being loaded and/or displayed on the at least one client device: display a user interface that includes information derived from the indication, wherein the user interface is sandboxed from the software application in a manner that prevents the software application from observing activity that occurs within the user interface.

20 Claims, 7 Drawing Sheets

(51) Int. Cl.
*G06F 11/30* (2006.01)
*G06F 21/53* (2013.01)

(56) References Cited

U.S. PATENT DOCUMENTS

| | | | |
|---|---|---|---|
| 10,032,160 B2* | 7/2018 | Desai | G06Q 10/067 |
| 11,344,812 B1 | 5/2022 | Parisi et al. | |
| 11,809,528 B2* | 11/2023 | Tsai | G06F 21/12 |
| 11,823,145 B2* | 11/2023 | Wong | G06Q 20/12 |
| 2007/0239983 A1* | 10/2007 | Shlomai | G06F 21/53 |
| | | | 713/166 |
| 2010/0299230 A1 | 11/2010 | Patterson et al. | |
| 2012/0296824 A1 | 11/2012 | Rosano | |
| 2013/0019310 A1* | 1/2013 | Ben-Itzhak | G06F 21/566 |
| | | | 726/23 |
| 2014/0025581 A1* | 1/2014 | Calman | G06Q 20/385 |
| | | | 705/65 |
| 2016/0110798 A1* | 4/2016 | Woo | G06Q 30/0613 |
| | | | 705/26.8 |
| 2016/0132880 A1* | 5/2016 | O'Regan | G06Q 20/3226 |
| | | | 705/44 |
| 2019/0266587 A1 | 8/2019 | Lin et al. | |
| 2021/0133698 A1 | 5/2021 | Zhang et al. | |
| 2021/0173902 A1* | 6/2021 | Tsai | G06F 21/44 |
| 2022/0172183 A1* | 6/2022 | Wong | G06Q 20/40145 |
| 2024/0104186 A1* | 3/2024 | Wadhwa | G06F 21/554 |
| 2024/0152885 A1* | 5/2024 | Wong | G06F 21/53 |

OTHER PUBLICATIONS

United Kingdom Application 2402690.8—Combined Search and Exam Report dated Aug. 13, 2024.
Japanese Patent Application No. 2024-040800—First Office Action dated Sep. 25, 2025.

\* cited by examiner

TECHNIQUES FOR MITIGATING ERRORS TIED TO SOFTWARE APPLICATIONS

CROSS-REFERENCE TO RELATED APPLICATIONS

The present application claims the benefit of U.S. Provisional Application No. 63/491,027, entitled "TECHNIQUES FOR MITIGATING ERRORS TIED TO SOFTWARE APPLICATIONS," filed Mar. 17, 2023, the content of which is incorporated by reference herein in its entirety for all purposes.

FIELD

The described embodiments set forth techniques for mitigating errors tied to software applications. For example, the techniques provide a framework for notifying users of software applications when their payment credentials become invalid, and for enabling the users to update their payment credentials to mitigate the invalidity.

BACKGROUND

Recent years have shown a proliferation in the number of individuals who own and operate computing devices (e.g., wearables, smartphones, tablets, etc.). Typically, an individual uses their computing device to conduct various activities throughout the day, e.g., placing phone calls, sending and receiving electronic messages, accessing the internet, and the like. In some cases, operating systems installed on the computing devices—in particular, native software applications that come pre-installed on the operating systems—can enable users to carry out the foregoing activities. However, third-party software applications can also be installed to enable the users to carry out additional/enhanced activities. For example, these software applications can include social network software applications, photo software applications, game software applications, and the like.

A common approach for enabling users of the computing devices to utilize software applications involves providing a software application store—referred to herein as an "app store"—that enables the users to download software applications onto their computing devices. In particular, the app store enables developers of software applications to upload their software applications to the app store along with descriptions, pricing information, screenshots, and the like. In turn, the users can utilize the app store to explore and install software applications that are useful/interesting to them. For example, the users can submit search queries with specific keywords for software applications they are interested in downloading, can view all software applications belonging to particular category in which they are interested (e.g., games), and so on. In another example, the app store can display software applications that are ranked according to various metrics—e.g., top-downloaded software applications, top-ranked software applications, etc.—to enable the users to identify software applications that are currently prevalent among all users.

It is important for software applications to execute issue-free in order to maximize user satisfaction. Notably, payment structures for software applications vary widely depending on their design, their intended users, and so on. For example, some software applications are free to use, some software applications offer "in-app purchases," some software applications require upfront and/or subscription payments, and so on. In this regard, maintaining valid customer billing information is critical when it comes to maintaining on-time and successful software application payments. Such billing information can include, for example, a valid credit or debit card number, a valid expiration date, and a valid billing address. Without valid billing information, payments cannot be processed, which can strain revenue streams and potentially cut off access to features expected by the users. Additionally, when billing issues arise, it can be challenging to notify the users in a manner that is both effective and non-invasive. In this regard, software developers may be unaware of the most efficient approach for notifying users of billing issues and recommending/facilitating remedies.

SUMMARY

The described embodiments set forth techniques for mitigating errors tied to software applications. For example, the techniques provide a framework for notifying users of software applications when their payment credentials become invalid, and for enabling the users to update their payment credentials to mitigate the invalidity.

One embodiment sets forth a method for mitigating errors tied to software applications. According to some embodiments, the method can be implemented at a server device, and include the steps of (1) identifying at least one error associated with a user of a software application, (2) identifying at least one client device associated with the user and on which the software application is installed, and (3) providing, to the at least one client device, an indication of the at least one error to cause the software application to, in conjunction with being loaded and/or displayed on the at least one client device: display a user interface that includes information derived from the indication, where the user interface is sandboxed from the software application in a manner that prevents the software application from observing activity that occurs within the user interface.

Another embodiment sets forth a method for mitigating errors tied to software applications. According to some embodiments, the method can be implemented at a client device, and include the steps of (1) receiving, from a server device, an indication of at least one error associated with a software application installed on the client device, (2) storing the indication, (3) detecting a launch and/or display of the software application, (4) prompting the software application for permission to display information associated with the indication of the at least one error, and (5) in response to receiving permission from the software application: causing the software application to display a user interface that includes the information, where the user interface is sandboxed from the software application in a manner that prevents the software application from observing activity that occurs within the user interface.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The described embodiments set forth techniques for mitigating errors tied to software applications. For example, the techniques provide a framework for notifying users of software applications when their payment credentials become invalid, and for enabling the users to update their payment credentials to mitigate the invalidity.

It is noted that although the following disclosure primarily focuses on payment-related errors associated with software applications, the embodiments are in no way limited to such a scope. On the contrary, the embodiments are applicable to all conceivable errors, issues, etc., that may arise place in association with software applications, such as errors, issues, etc. related to user accounts, billings, configurations, and so on.

Figure 1:
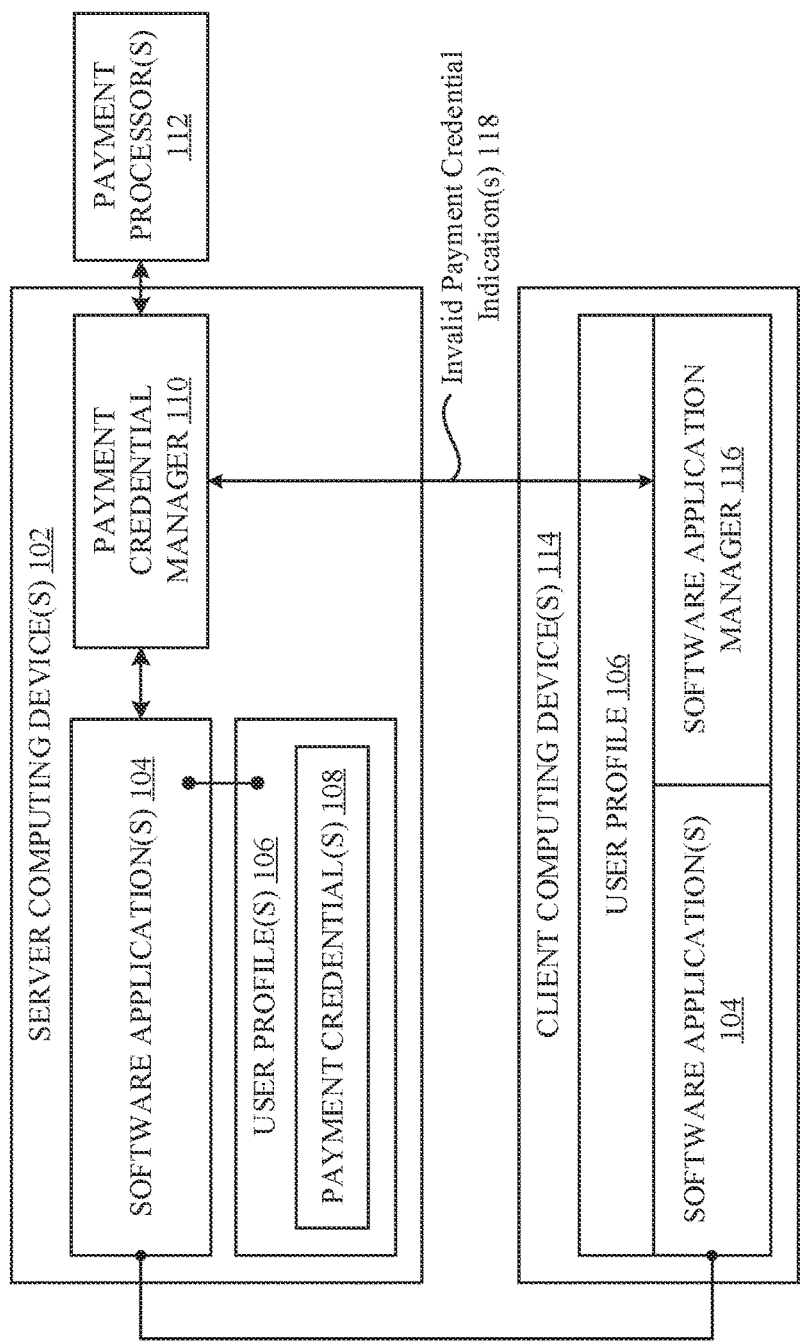
FIG. 1 illustrates a block diagram of different components of a system that can be configured to implement the various techniques described herein, according to some embodiments.

FIG. 1 illustrates a block diagram of different components of a system 100 that can implement the various techniques described herein, according to some embodiments. As shown in FIG. 1, the system 100 can include one or more server computing devices 102 that enable users of client computing devices 114—e.g., smart phones, tablets, laptops, desktops, etc.—to access a software application store (not illustrated in FIG. 1) hosted by the server computing devices 102. In some embodiments, the software application store can enable software developers to upload software applications 104 to be made available through the software application store. Conversely, the client computing devices 114 can execute a counterpart software application (not illustrated in FIG. 1)—referred to herein as a software application store client—that enables the client computing devices 114 to interface with the software application store implemented by the server computing devices 102. For example, a software application store client (executing on a given client computing device 114) can enable a user to browse for software applications 104 that they may be interested in downloading and installing, e.g., productivity software applications, social networking software applications, game software applications, and the like. In turn, when the user identifies a particular software application 104 of interest, the software application store client can cause the client computing device 114 to download and install the software application 104 onto the client computing device 114 in a seamless manner. Subsequently, the user can access the software application 104 on their client computing device 114.

As a brief aside, it is noted that the embodiments disclosed herein are not limited to the foregoing architecture that involves the software application store/software application store clients. On the contrary, the server computing devices 102 can be configured to provide the various functionalities described herein independent of or absent from the implementation of a software application store. For example, the server computing devices 102 can be configured to identify and help mitigate payment credential issues that arise in relation to the utilization of software applications 104 on the client computing devices 114. Moreover, the client computing devices 114 can be configured to provide the various functionalities described herein independent of or absent from the implementation of software application store clients. For example, the client computing devices 114 can be configured to install, load, display, etc., software applications 104 without interfacing with a software application store (commonly referred to as "sideloading"), as well as interface with the server computing devices 102 to obtain the benefit of the payment credential issue identification/mitigation techniques described herein.

In any case, as shown in FIG. 1, each client computing device 114 can have any number of software applications 104 installed thereon, and can implement a software application manager 116 that is configured to facilitate installations, executions (e.g., loading, displaying, etc.), and so on, of the software applications 104. Each client computing device 114 can also be associated with a user profile 106. Such an association can be established, for example, when a user of the client computing device 114 provides the requisite information to create, log into, etc., a user profile 106 using the client computing device 114. According to some embodiments, a user profile 106 for a user can include username/password information, contact information associated with the user, demographic information associated with the user, and so on. It is noted that the foregoing examples are not meant to be limiting, and that the user profiles 106 can store any user-related (or other) information, at any level of granularity, without departing from the scope of this disclosure. The user profile 106 can also include one or more payment credentials 108 associated with the user, which can include credit card information, gift card information, debit card information, bank account information, and so on. It is noted that the foregoing examples are not meant to be limiting, and that the payment credentials 108 can store any payment-related (or other) information, at any level of granularity, without departing from the scope of this disclosure.

As shown in FIG. 1, the server computing device 102 can associate any number of user profiles 106 with a given software application 104. Such associations can be formed, for example, between a given software application 104 and user profiles 106 of users who have installed the software application 104 on at least one client computing device 114. Although not illustrated in FIG. 1, the server computing device 102 can manage information that enables a given user to use different payment credentials 108 for different software applications 104. For example, the user may prefer to utilize a first payment credential 108 to provide payments for a first software application 104, and to utilize a second payment credential 108 to provide payments for a second software application 104. In this regard, the server computing device 102 can store information—e.g., with the software applications 104, the user profiles 106, etc.—that indicates, for each user profile 106 associated with a given software application 104, the user's preferred payment credential 108 for the software application 104.

Additionally, the server computing devices 102 can be configured to implement a payment credential manager 110 that assesses the validity of payment credentials 108 associated with user profiles 106. In some cases, the payment credential manager 110 can self-determine the validity of a given payment credential 108. For example, if the current date exceeds the expiration date of a payment credential 108, then the payment credential manager 110 can reliably conclude that the payment credential 108 is invalid. In another example, if the available balance, credit limit, etc., is insufficient to satisfy an upcoming payment (e.g., an upcoming subscription fee that will be due), then the payment credential manager 110 can reliably conclude that the payment credential is invalid.

In other cases, the payment credential manager 110 can interface with payment processors 112 to determine whether payment credentials are valid. For example, the payment credential manager 110 can provide a given payment credential 108 to the payment processors 112 to receive an indication as to the validity of the payment credential 108. Such provision of the payment credential 108 can be performed, for example, on a periodic basis, a conditional basis, and so on. In another example, the payment credential manager 110 can be notified by the payment processors 112 when a given payment credential 108 has become invalid. Such a notification can occur, for example, when the payment credential manager 110 attempts to facilitate a transaction using a payment credential 108 that, according to the payment processor 112, is invalid. It is noted that the foregoing examples are not meant to be limiting, and that any approach can be utilized by the server computing devices 102 to effectively identify payment credentials 108 that are invalid.

According to some embodiments, the payment credential manager 110 can, upon identifying that a given payment credential 108 is invalid, take any number of actions to remediate the issue. As shown in FIG. 1, such actions can include providing one or more invalid payment credential indications 118 where appropriate. For example, the server computing device 102 can identify one or more software applications 104 that will be affected by the invalid payment credential 108. The identified one or more software application 104 can include, for example, those having subscription fees, renewal fees, upgrade fees, etc., that will be due within a threshold period of time and that rely on the payment credential 108 for payment. In turn, the server computing device 102 can identify one or more client computing devices 114 on which the one or more software applications 104 are installed. Subsequently, the server computing device 102 can provide invalid payment credential indications 118 to the software application managers 116 on the identified one or more client computing devices 114. In this manner—and, as described in greater detail herein—the software application managers 116 can effectively notify a user of the issue, as well as provide avenues to remedy the issue.

It should be understood that the various components of the computing devices illustrated in FIG. 1 are presented at a high level in the interest of simplification. For example, although not illustrated in FIG. 1, it should be appreciated that the various computing devices can include common hardware/software components that enable the above-described software entities to be implemented. For example, each of the computing devices can include one or more processors that, in conjunction with one or more volatile memories (e.g., a dynamic random-access memory (DRAM)) and one or more storage devices (e.g., hard drives, solid-state drives (SSDs), etc.), enable the various software entities described herein to be executed. Moreover, each of the computing devices can include communications components that enable the computing devices to transmit information between one another (e.g., using the Internet).

A more detailed explanation of these hardware components is provided below in conjunction with FIG. 5. It should additionally be understood that the computing devices can include additional entities that enable the implementation of the various techniques described herein without departing from the scope of this disclosure. It should additionally be understood that the entities described herein can be combined or split into additional entities without departing from the scope of this disclosure. It should further be understood that the various entities described herein can be implemented using software-based or hardware-based approaches without departing from the scope of this disclosure.

Accordingly, FIG. 1 provides an overview of the manner in which the system 100—in particular, the server computing devices 102 and the client computing devices 114—can implement the various techniques described herein, according to some embodiments. A more detailed breakdown of the manner in which these techniques can be implemented will now be provided below in conjunction with FIGS. 2, 3A-3B, and 4A-4B.

Figure 2:
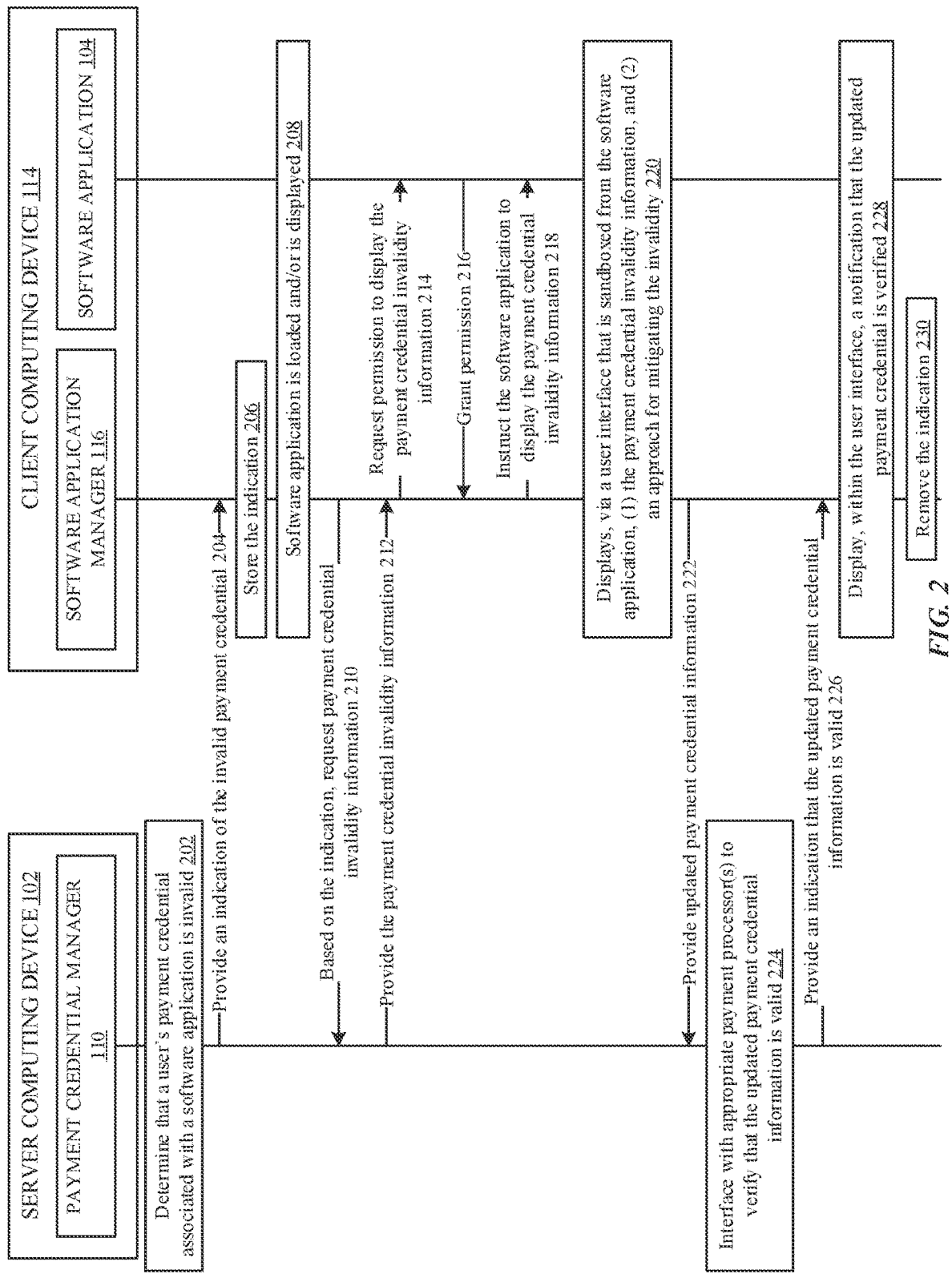
FIG. 2 illustrates a detailed sequence diagram of a technique for mitigating errors tied to software applications, according to some embodiments.

FIG. 2 illustrates a detailed sequence diagram of a technique for mitigating errors tied to software applications, according to some embodiments. As shown in FIG. 2, the sequence diagram begins at step 202, where a server computing device 102—e.g., a payment credential manager 110 executing on the server computing device 102—determines that a user's payment credential 108 associated with a software application 104 is invalid. The payment credential manager 110 can make this determination using any of the techniques described herein, e.g., by self-determining the invalidity, by receiving an indication from payment processors 112, and so on.

At step 204, the payment credential manager 110 provides, to a software application manager 116 executing on a client computing device 114 on which the software application 104 is installed, an indication of the invalid payment credential 108. According to some embodiments, the indication can be associated with a unique identifier that is also associated with the software application 104. As a brief aside, it is noted that, in the interest of simplicity, the embodiments and examples described herein primarily discuss the server computing device 102/payment credential manager 110 interacting with a single client computing device 114. However, as described above in conjunction with FIG. 1, the payment credential manager 110 can provide indications to other software application managers 116 on other client computing devices 114 on which the software application 104 is also installed. This can be useful when the software application 104 is installed on two or more client computing devices 114 of the same user, in that the user can be notified of the issue (as described below) on any of the client computing devices 114 the user happens to operate.

At step 206, the software application manager 116 receives the indication from the payment credential manager 110 and stores the indication in a storage that is accessible to the client computing device 114 (e.g., a local storage, a network storage, a cloud storage, etc.). Again, when indications are sent to multiple client computing devices 114, each client computing device 114 can store the indication using the foregoing approach (or an alternative approach that is appropriate for the configuration of the client computing device 114).

At step 208, the software application 104 is loaded and/or is displayed on the client computing device 114. As shown in FIG. 2, loading and/or displaying the software application 104 can involve both the software application 104 and the software application manager 116. For example, the software application manager 116 can receive a request to load and/or display the software application 104 (e.g., through selection of an icon associated with the software application 104), and then take the appropriate action(s) to process the request. The request can be issued, for example, when a user of the client computing device 114 utilizes a user interface to load the software application 104 for a first time (relative to a last reset of the client computing device 114), to display the software application 104 (after it has been loaded), and so on. In this regard—and, as described in greater detail below—the software application manager 116 can identify, based on indications that are stored in conjunction with step 206, whether additional action should be taken in response to a software application 104 being loaded and/or displayed.

At step 210, software application manager 116 identifies the indication (received/stored at step 206) in conjunction with loading and/or displaying the software application 104. The identification can be achieved, for example, by determining whether the unique identifier associated with the software application 104 matches the unique identifiers of any of the indications stored on the client computing device 114. In turn—and, in response to identifying an indication having a matching identifier—the software application manager 116 issues, to the payment credential manager 110, a request for payment credential invalidity information.

At step 212, the payment credential manager 110 provides, to the software application manager 116, the payment credential invalidity information. The payment credential invalidity information can encompass any information, at any level of granularity, that is effective for notifying the user of the nature of the issue with the payment credential 108. For example, the payment credential invalidity information can include a uniform resource locator (URL) to a webpage that, when rendered on the client computing device 114, effectively communicates the nature of the issue with the payment credential 108. In another example, the payment credential invalidity information can include hypertext markup language (HTML) code that, when rendered on the client computing device 114, constitutes a webpage that effectively communicates the nature of the issue with the payment credential 108. In yet another example, the payment credential invalidity information can include binary (e.g., blob) information that, when rendered on the client computing device 114, constitutes an image, a video, an interactive user interface, etc., that effectively communicates the nature of the issue with the payment credential 108. It is noted that the foregoing examples are not meant to be limiting, and that the payment credential invalidity information can take any form that is effective for communicating the nature of the issue with the payment credential, without departing from the scope of this disclosure.

Additionally, the payment credential invalidity information can encompass any information, at any level of granularity, that is effective for enabling the user to mitigate the issue with the payment credential. For example, the payment credential invalidity information can include a URL to a webpage that, when rendered on the client computing device 114, enables the user to update the payment credential 108, to provide a new payment credential 108, and so on. In another example, the payment credential invalidity information can include HTML code that, when rendered on the client computing device 114, constitutes a webpage that enables the user to update the payment credential 108, provide a new payment credential 108, and so on. In yet another example, the payment credential invalidity information can include binary (e.g., blob) information that, when rendered on the client computing device 114, constitutes an interactive user interface that enables the user to update the payment credential 108, provide a new payment credential 108, and so on. It is noted that the foregoing examples are not meant to be limiting, and that the payment credential invalidity information can take any form that can be used to effectively enable the user to mitigate the issue with the payment credential 108, without departing from the scope of this disclosure.

It is noted that the payment credential invalidity information can be formatted using any approach without departing from the scope of this disclosure. For example, each software application 104 can be associated with a respective template into which the payment credential invalidity information can be formatted. In another example, particular templates can be used for particular types of software applications 104, e.g., a first template can be used for subscription-based software applications 104, a second template can be used for software applications 104 that offer in-app purchases, and so on. It is noted that the foregoing examples are not meant to be limiting, and that the server computing device 102 can utilize any number of templates (or the like), at any level of granularity/specificity, without departing from the scope of this disclosure.

As a brief aside—and, although not illustrated in FIG. 2—the payment credential manager 110 can, prior to providing the payment credential invalidity information, redundantly determine whether the payment credential 108 is still invalid (e.g., by re-executing step 202). This can be beneficial in scenarios where the payment credential 108 transitions from being invalid to valid any time between steps 202 and step 210. Such a transition can occur, for example, when an account freeze is lifted, when a gift card balance is increased, when an available credit limit is increased, and so on. If/when this occurs, the payment credential manager 110 can, at step 212, instead provide an indication that the payment credential 108 is valid. In turn, the software application manager 116 can remove the indication from the storage, and the remaining steps in the sequence diagram of FIG. 2 can be disregarded.

Returning now to FIG. 2, at step 214, the software application manager 116 issues, to the software application 104, a request for permission to display the payment credential invalidity information. The request can be provided to the software application 104 using any approach that is effective for enabling software entities on the client computing device 114 to communicate with one another. For example, the software application manager 116/software application 104 can implement a software development kit (SDK), an application programming interface (API), etc., that enables (1) the software application manager 116 to transmit the request to the software application 104, and (2) the software application 104 to receive/interpret the request. Beneficially, such a request can provide an authorized entity associated with the software application 104 (e.g., a developer, a distributor, etc.) the ability to suppress the display of the payment credential invalidity information. This can be useful, for example, when the authorized entity has plans to enhance features of the software application 104, its pricing, etc., where prompting the user about payment after the updates have been made will be more likely to result in the user updating their payment credential 108 so that the payment can be made.

In turn, at step 216, the software application 104 grants permission to the software application manager 116. According to some embodiments, the software application 104 can grant the permission using the same (or different) approach used to transmit the request described above in conjunction with step 214. It is noted that, when the software application 104 denies permission, the software application manager 116 can take a variety of actions. In one example, the software application manager 116 can maintain the indication in the storage such that steps 210 through 214 are carried out each time step 208 occurs. In another example, the software application manager 116 can, in view of the denial of permission, choose to prompt the software application 104 periodically, e.g., every time, every other time, etc., the software application 104 is loaded/displayed. It is noted that the foregoing examples are not meant to be limiting, and that the software application manager 116 can take any action, in any form, in response to receiving a denial from the software application 104, without departing from the scope of this disclosure.

At step 218, software application manager 116 instructs the software application 104 to display the payment credential invalidity information. This step can be implemented using the same (or different) approach used to transmit the request/permission described above in conjunction with steps 214/216, respectively.

At step 220, the software application manager 116/software application 104 displays, via a user interface that is sandboxed from the software application 104, (1) the payment credential invalidity information, and (2) an approach (i.e., a mechanism) for mitigating the invalidity. As a brief aside—and, as described herein—sandboxing the user interface from the software application 104 involves prohibiting the software application 104 from viewing activity that takes place within the user interface. Such activity can include, for example, displaying the payment credential invalidity information, receiving inputs (e.g., updated payment credentials), and so on. In this manner, the software application 104 can understand that a billing issue is taking place (e.g., by way of steps 214 and 216), yet remain uninformed of the specific nature of the billing issue, as well as any remedial measures that are pursued via the user interface.

To achieve the sandboxing limitations described herein, a first example approach can involve causing the payment credential invalidity information to be displayed (e.g., as an overlay) within a window of a user interface of the software application 104. This can be achieved, for example, by mandating (e.g., through the API, SDK, etc., described herein) that the software application 104 permits the display of a window to which the software application 104 does not have access rights. In another example, step 220 can involve causing the payment credential invalidity information to be displayed within a user interface that is separate and distinct from the software application 104—such as a user interface that is controlled by the software application manager 116, an operating system of the client computing device 114, and the like. Under this approach, the software application 104 is naturally prohibited from accessing the user interface given the user interface is managed outside of the scope of the software application 104. It is noted that the foregoing examples are not meant to be limiting, and that any approach can be utilized to effectively display the payment credential invalidity information to the user of the client computing device 114.

At step 222, the software application manager 116 provides, to the payment credential manager 110, updated payment credential information. According to some embodiments, step 222 can be performed in response to the software application manager 116 receiving updated payment credential information through the user interface displayed in conjunction with step 220. It is noted, however, that the sequence diagram of FIG. 2 can be modified when the user interface of 220 displays a web page linked to a URL (as described herein). Under such an approach, the updated payment credentials are received by an alternative entity and thereby obviate the need for step 222 to be implemented. Instead, the payment credential manager 110 can receive the updated payment credentials from the alternative entity and perform the remaining steps of the sequence diagram of FIG. 2, where appropriate.

At step 224, the payment credential manager 110 interfaces with one or more payment processors 112 to verify that the updated payment credential information is valid. As described herein, this step can include, for example, attempting to bill the updated payment credential information for a payment that is due, requesting a confirmation that the updated payment credential information will be valid for a future payment that will be due, and so on. It is noted that the foregoing examples are not meant to be limiting, and that any approach can be used to validate the updated payment credential information relative to the context of the billing issue, without departing from the scope of this disclosure.

At step 226, the payment credential manager 110 provides, to the software application manager 116, an indication that the updated payment credential information is valid. In turn, at step 228, the payment credential manager 110/software application 104 displays, within the user interface (discussed above in conjunction with step 220), a notification that the updated payment credential information is valid. At step 230, the software application manager 116 removes the indication that was stored in conjunction with step 206. It is noted that when the indication provided at step 204 is provided to two or more client computing devices 114, the removal of the indication at one client computing device 114 can cause (e.g., through direct communications, through the server computing devices 102, etc.) the other client computing devices 114 to also remove the indication.

In this manner, the software application 104 will not be inaccurately notified of a billing issue when subsequent loads and/or displays of the software application 104 take place.

Additionally, it is noted that when the payment credential manager 110 receives, from the payment processor 112, an indication that updated payment credential information is invalid, appropriate adjustments to steps 226 through 228 can be implemented. In particular, at step 226, the payment credential manager 110 can provide, to the software application manager 116, an indication that the updated payment credential is invalid. In turn, at step 228, the payment credential manager 110/software application 104 displays, within the user interface (discussed above in conjunction with step 220), a notification that the updated payment credential information is invalid, and can also enable appropriate corrections to be provided. When such corrections are provided, steps 222 through 228 can be re-executed until valid updated payment credential information is obtained. In turn, at step 230, the software application manager 116 can remove the indication that was stored in conjunction with step 206, as described herein.

Accordingly, FIG. 2 sets forth a detailed sequence diagram of a technique for mitigating errors tied to software applications, according to some embodiments. FIG. 3, which is described below, sets forth a high-level method diagram of steps that can be implemented by the server computing device 102/payment credential manager 110, according to some embodiments. FIG. 4, which is also described below, sets forth a high-level method diagram of steps that can be implemented by the client computing device 114/software application manager 116, according to some embodiments. Finally, FIGS. 4A-4B sets forth conceptual diagrams of example user interfaces that can be implemented in accordance with the techniques described herein, according to some embodiments.

Figure 3A:
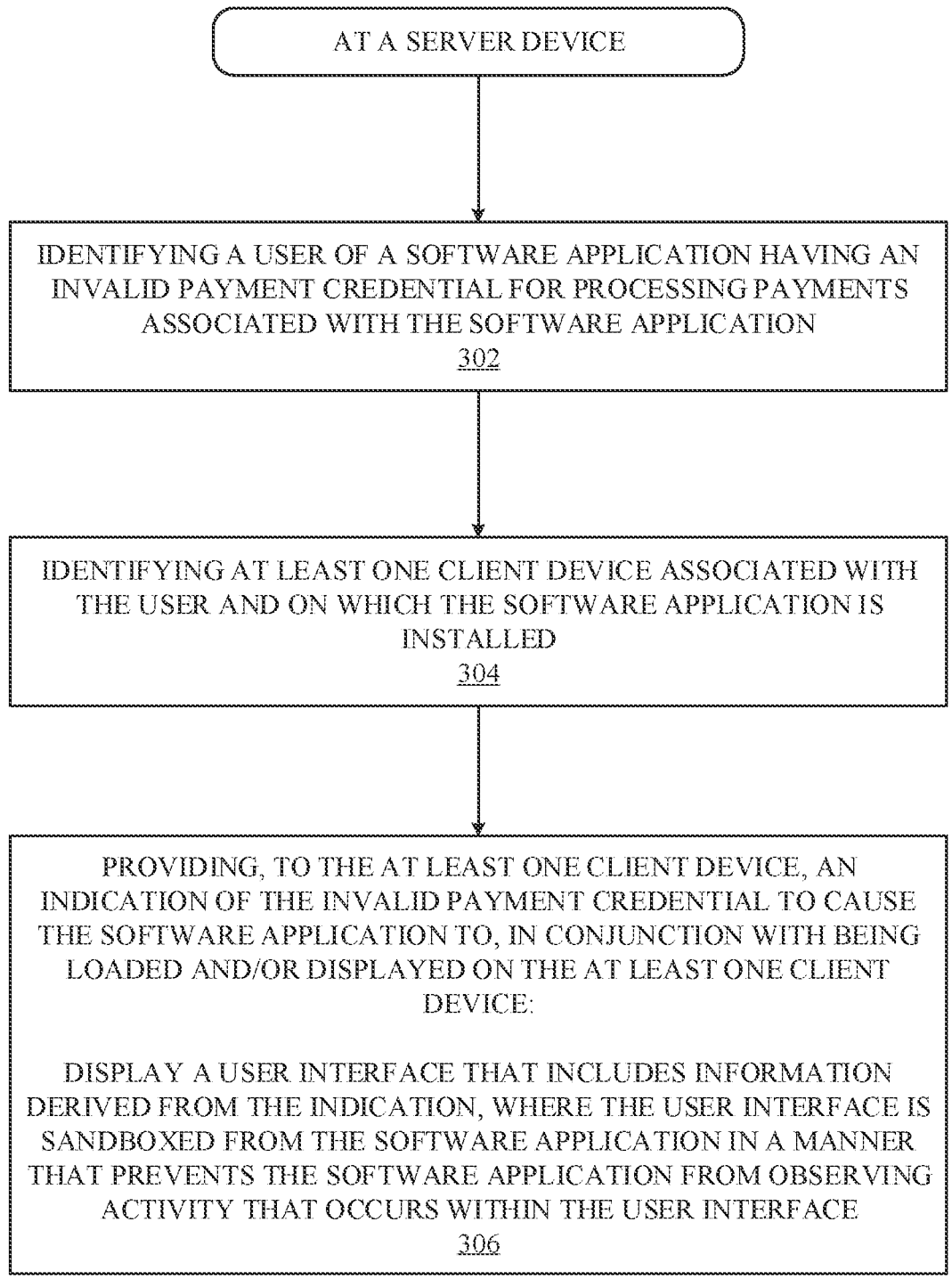
FIGS. 3A-3B illustrate methods for mitigating errors tied to software applications, according to some embodiments.

FIG. 3A illustrates a method 300 for mitigating errors tied to software applications, according to some embodiments. As shown in FIG. 3, the method 300 begins at step 302, where a server computing device 102 (e.g., the payment credential manager 110 executing thereon) identifies a user of a software application having an invalid payment credential for processing payments associated with the software application (e.g., in accordance with the techniques described above in conjunction with step 202 of FIG. 2). As described herein, the server device can identify the invalid payment credential by self-detecting the at least one issue, by interfacing with payment processors to detect the at least one issue, and so on. At step 304, the server computing device 102 identifies at least one client device associated with the user and on which the software application is installed (e.g., in accordance with the techniques described above in conjunction with step 202 of FIG. 2).

At step 306, the server computing device 102 provides, to the at least one client device, an indication of the invalid payment credential (e.g., in accordance with the techniques described above in conjunction with step 204 of FIG. 2). According to some embodiments, the indication causes the software application to cache the indication until the software application is loaded and/or displayed. As described herein, the indication can ultimately cause the software application to, in conjunction with being loaded and/or displayed on the at least one client device display a user interface that includes information derived from the indication, where the user interface is sandboxed from the software application in a manner that prevents the software application from observing activity that occurs within the user interface (e.g., in accordance with the techniques described above in conjunction with steps 208 through 220 of FIG. 2).

According to some embodiments, the information describes at least one issue associated with the invalid payment credential, and the at least one issue comprises at least one of invalid billing information, insufficient funds, or insufficient available credit associated with the invalid payment credential. According to some embodiments, the user interface permits the user to replace the invalid payment credential with a valid payment credential by providing valid payment credential information, and the activity comprises the user providing the valid payment credential information.

According to some embodiments, and although not illustrated in FIG. 3A, the method 300 can include an additional step of permitting the software application to suppress the user interface for a particular period of time that, when lapsed, causes the software application to display the user interface.

Figure 3B:
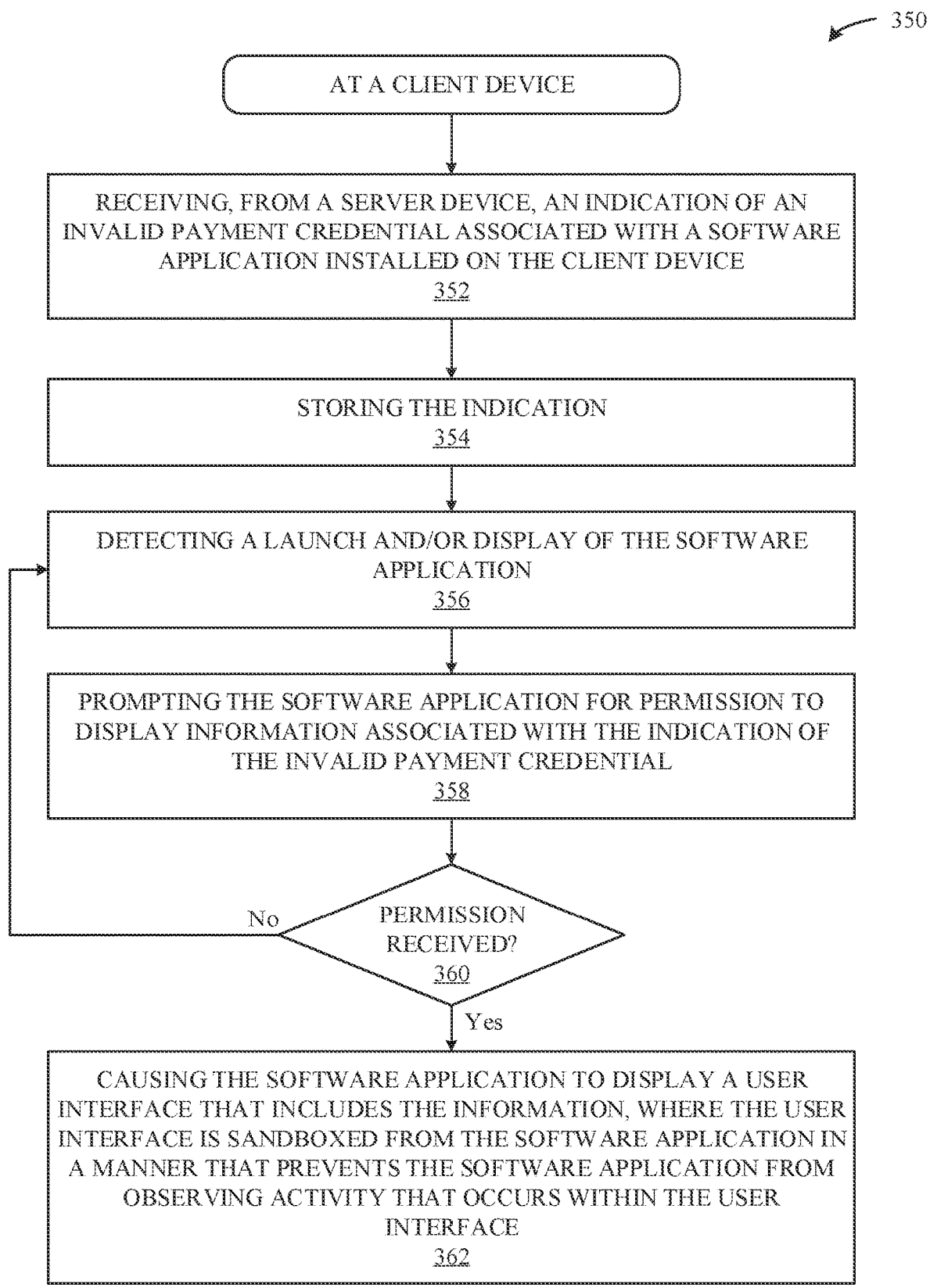

FIG. 3B illustrates a method 350 for mitigating errors tied to software applications, according to some embodiments. As shown in FIG. 3, the method 350 begins at step 352, where a client computing device 114 (e.g., a software application manager 116 executing thereon) receives, from a server device, an indication of an invalid payment credential associated with a software application installed on the client device (e.g., in accordance with the techniques described above in conjunction with step 204 of FIG. 2).

At step 354, the client computing device 114 stores the indication (e.g., in accordance with the techniques described above in conjunction with step 206 of FIG. 2). At step 356, the client computing device 114 detects a launch and/or display of the software application (e.g., in accordance with the techniques described above in conjunction with step 208 of FIG. 2).

At step 358, the client computing device 114 prompts the software application for permission to display information associated with the indication of the invalid payment credential (e.g., in accordance with the techniques described above in conjunction with step 214 of FIG. 2). At step 360, the client computing device 114 determines whether permission is received (e.g., in accordance with the techniques described above in conjunction with steps 214 and 216 of FIG. 2). If, at step 360, the client computing device 114 determines that permission received, then the method 350 proceeds to step 362 (e.g., in accordance with the techniques described above in conjunction with steps 214 and 216 of FIG. 2). Otherwise, the method 350 proceeds back to step 356 (e.g., in accordance with the techniques described above in conjunction with steps 214 and 216 of FIG. 2).

At step 362, the client computing device 114 causes the software application to display a user interface that includes the information, where the user interface is sandboxed from the software application in a manner that prevents the software application from observing activity that occurs within the user interface (e.g., in accordance with the techniques described above in conjunction with step 220 of FIG. 2). Additionally, and although not illustrated in FIG. 3B, the method 350 can include the additional steps of (1) receiving, from the server device, a second indication that the invalid payment credential has been replaced with a valid payment credential, and (2) removing the indication from the cache (e.g., in accordance with the techniques described above in conjunction with steps 226 through 230 of FIG. 2).

Figure 4A:
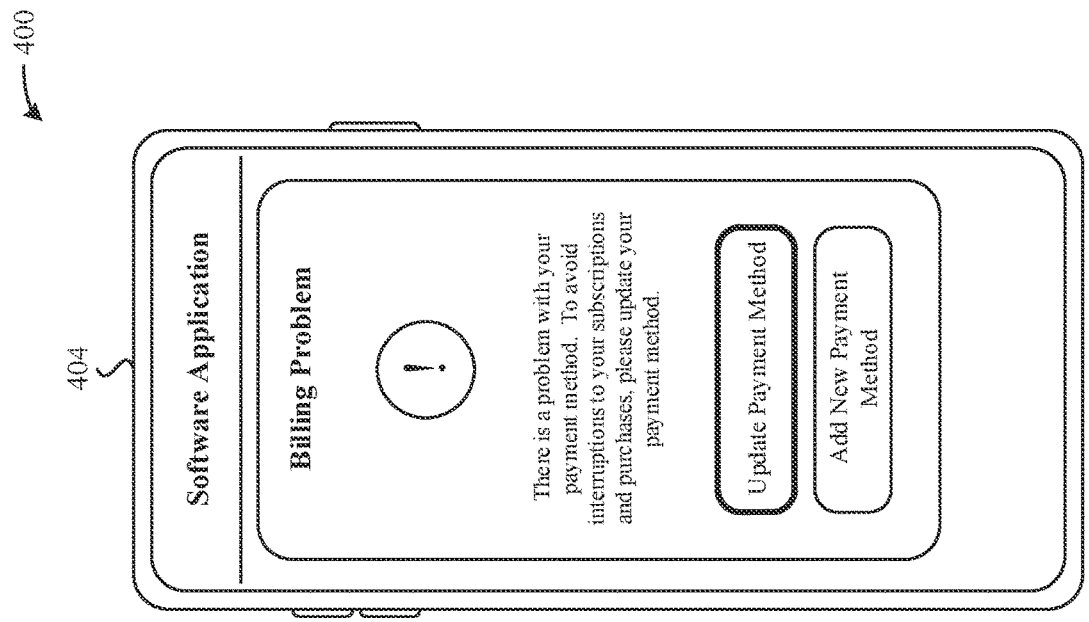
FIGS. 4A-4B illustrate conceptual diagrams of example user interfaces that can be displayed on client computing devices, according to some embodiments.
Figure 4A:
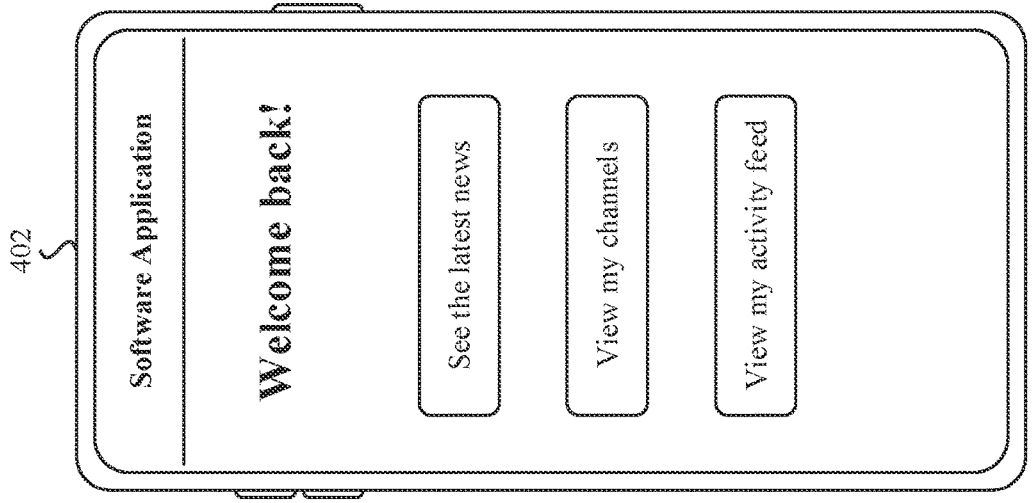
Figure 4B:
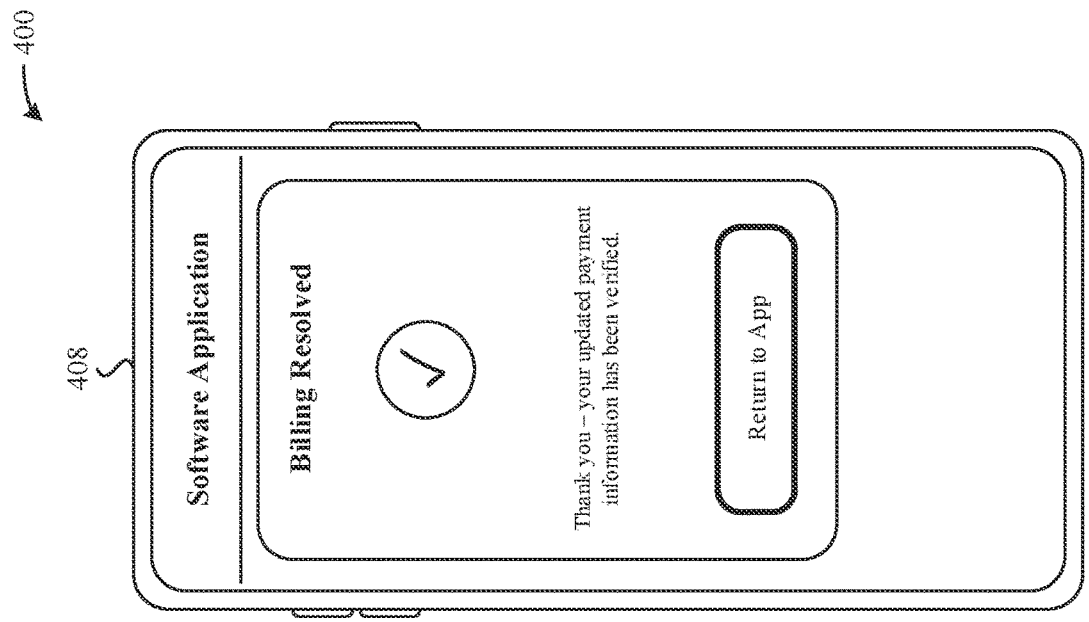
Figure 4B:
Figure 4B:
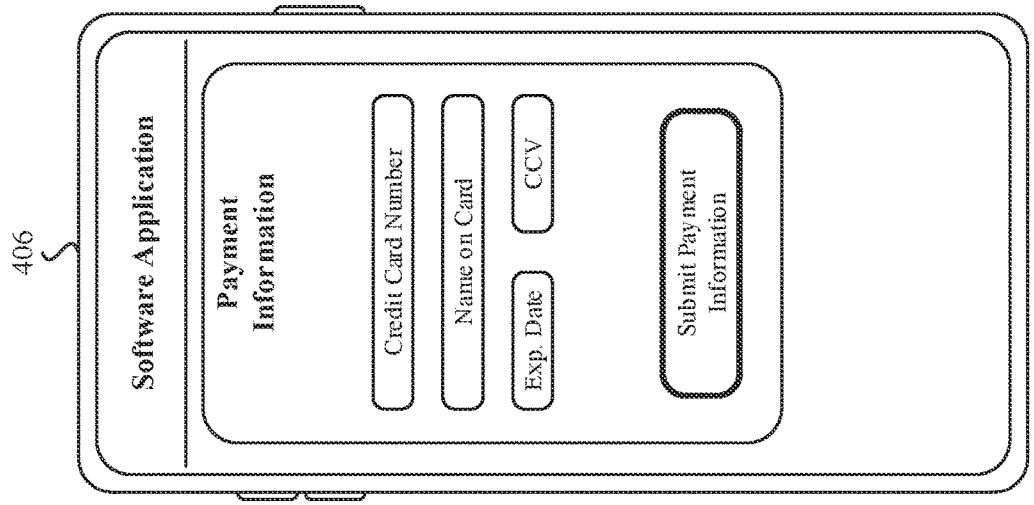

FIGS. 4A-4B illustrate conceptual diagrams 400 of example user interfaces that can be displayed on a client computing device 114, according to some embodiments. In particular, a user interface 402 can be displayed at the client computing device 114 in conjunction with step 208 of FIG. 2 being implemented. Next, a user interface 404 can be displayed at the client computing device 114 in conjunction with steps 202 through 220 of FIG. 2 being implemented. Further, a user interface 406 can be displayed at the client computing device 114 in conjunction with steps 222 and 224 of FIG. 2 being implemented. Further, a user interface 408 can be displayed at the client computing device 114 in conjunction with steps 228 and 230 of FIG. 2 being implemented. It is noted that the user interfaces illustrated in FIGS. 4A-4B are not meant to be limiting, and that the user interfaces described herein can be implemented using any approach, to display any form of information, without departing from the scope of this disclosure.

Figure 5:
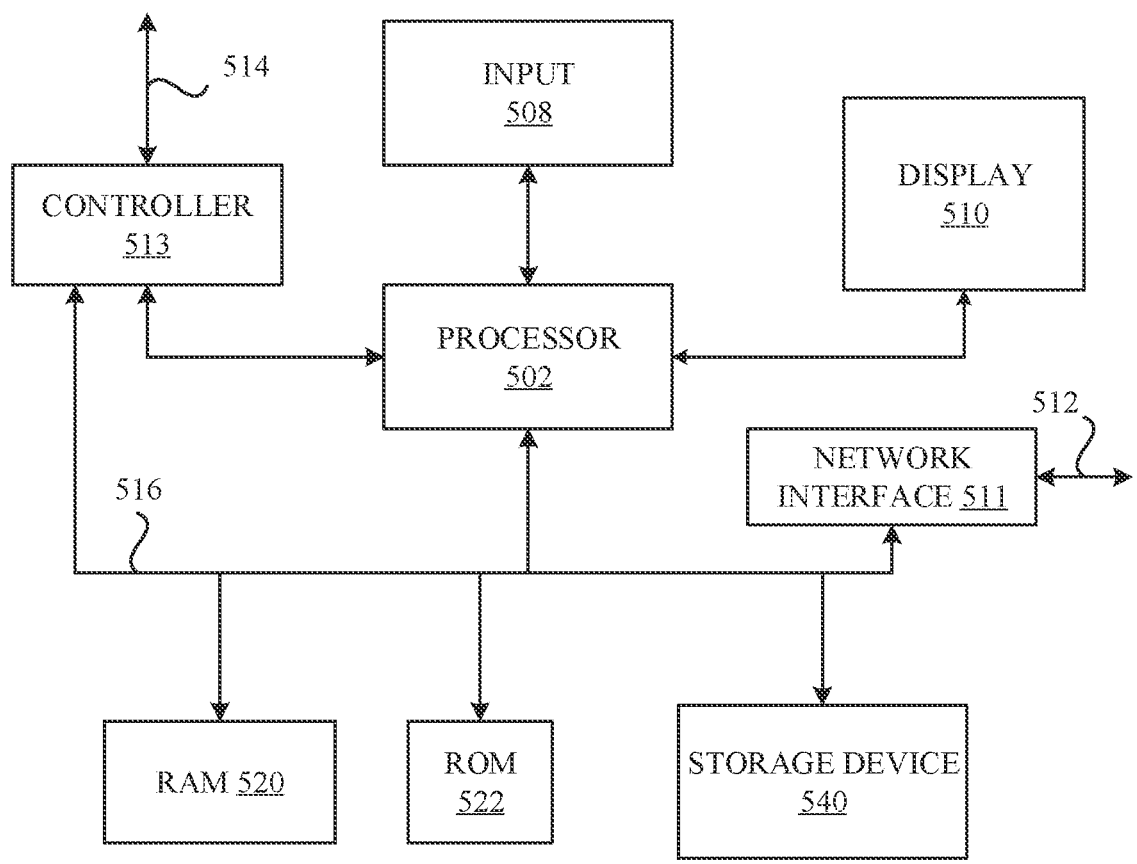
FIG. 5 illustrates a detailed view of a computing device that can be used to implement the various components described herein, according to some embodiments.

FIG. 5 illustrates a detailed view of a computing device 500 that can be used to implement the various components described herein, according to some embodiments. In particular, the detailed view illustrates various components that can be included in server computing devices 102, payment processors 112, and client computing devices 114 described above in conjunction with FIG. 1.

As shown in FIG. 5, the computing device 500 can include a processor 502 that represents a microprocessor or controller for controlling the overall operation of computing device 500. The computing device 500 can also include a user input device 508 that allows a user of the computing device 500 to interact with the computing device 500. For example, the user input device 508 can take a variety of forms, such as a button, keypad, dial, touch screen, audio input interface, visual/image capture input interface, input in the form of sensor data, etc. Furthermore, the computing device 500 can include a display 510 (screen display) that can be controlled by the processor 502 to display information to the user. A data bus 516 can facilitate data transfer between at least a storage device 540, the processor 502, and a controller 513. The controller 513 can be used to interface with and control different equipment through and equipment control bus 514. The computing device 500 can also include a network/bus interface 511 that couples to a data link 512. In the case of a wireless connection, the network/bus interface 511 can include a wireless transceiver.

The computing device 500 also includes a storage device 540, which can comprise a single disk or a plurality of disks (e.g., SSDs), and includes a storage management module that manages one or more partitions within the storage device 540. In some embodiments, storage device 540 can include flash memory, semiconductor (solid state) memory or the like. The computing device 500 can also include a Random-Access Memory (RAM) 520 and a Read-Only Memory (ROM) 522. The ROM 522 can store programs, utilities or processes to be executed in a non-volatile manner. The RAM 520 can provide volatile data storage, and stores instructions related to the operation of the computing devices described herein.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data that can be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for mitigating errors tied to software applications, the method comprising, at a server device:
identifying at least one error associated with a user of a software application;
identifying at least one client device associated with the user and on which the software application is installed; and
providing, to the at least one client device, an indication of the at least one error to cause the software application to, in conjunction with being loaded and/or displayed on the at least one client device, wherein providing the indication comprises:
sandboxing an overlay user interface that includes information derived from the indication;
displaying, within a main user interface of the software application, the overlay user interface; and
permitting the software application to suppress the overlay user interface for a particular period of time that, when lapsed, causes the software application to display the overlay user interface.

2. The method of claim 1, wherein the information describes at least one issue associated with the at least one error.

3. The method of claim 2, wherein the at least one issue comprises at least one of: invalid credential information associated with the user and/or the software application, or invalid configuration information associated with the user and/or the software application.

4. The method of claim 2, wherein the server device identifies the at least one error by detecting the at least one issue.

5. The method of claim 1, wherein:
the overlay user interface permits the user to provide input for mitigating the at least one error, and
user activity comprises the user providing the input.

6. The method of claim 1, wherein the indication causes the software application to cache the indication until the software application is loaded and/or displayed.

7. A non-transitory computer readable storage medium configured to store instructions that, when executed by a processor included in a server device, cause the server device to mitigate errors tied to software applications, by carrying out steps that include:
identifying at least one error associated with a user of a software application;
identifying at least one client device associated with the user and on which the software application is installed; and providing, to the at least one client device, an indication of the at least one error to cause the software application to, in conjunction with being loaded and/or displayed on the at least one client device, wherein providing the indication comprises:
    sandboxing an overlay user interface that includes information derived from the indication;
    display displaying, within a main user interface of the software application, the overlay user interface; and
    permit the software application to suppress the overlay user interface for a particular period of time that, when lapsed, causes the software application to display the overlay user interface.

8. The non-transitory computer readable storage medium of claim 7, wherein the information describes at least one issue associated with the at least one error.

9. The non-transitory computer readable storage medium of claim 8, wherein the at least one issue comprises at least one of:
    invalid credential information associated with the user and/or the software application, or
    invalid configuration information associated with the user and/or the software application.

10. The non-transitory computer readable storage medium of claim 8, wherein the server device identifies the at least one error by detecting the at least one issue.

11. The non-transitory computer readable storage medium of claim 7,
    wherein:
    the overlay user interface permits the user to provide input for mitigating the at least one error, and
    user activity comprises the user providing the input.

12. The non-transitory computer readable storage medium of claim 7, wherein the indication causes the software application to cache the indication until the software application is loaded and/or displayed.

13. A method for mitigating errors tied to software applications, the method comprising, at a client device:
    receiving, from a server device, an indication of at least one error associated with a software application installed on the client device;
    storing the indication;
    detecting a launch and/or display of the software application;
    prompting the software application for permission to display information associated with the indication of the at least one error; and
    in response to receiving permission from the software application:
        sandboxing an overlay user interface that includes information derived from the indication;
        causing the software application to display the overlay user interface that includes the information; and
        permit the software application to suppress the overlay user interface for a particular period of time that, when lapsed, causes the software application to display the overlay user interface.

14. The method of claim 13, wherein:
    the method is implemented by a software application manager executing on the client device, wherein the method further comprises the software application manager enabling execution of a plurality of software applications, and
    the plurality of software applications includes the software application.

15. The method of claim 13, wherein storing the indication comprises storing the indication into a cache that is accessible to the client device.

16. The method of claim 15, further comprising:
    receiving, from the server device, a second indication that the error has been mitigated; and
    removing the indication from the cache.

17. The method of claim 13, wherein the information describes at least one issue associated with the at least one error.

18. The method of claim 13, further comprising:
    enabling, using the overlay user interface, valid credential information associated with a user of the client device to be provided, or
    enabling, using the overlay user interface, valid configuration information associated with the user and/or the software application to be provided.

19. The method of claim 13, wherein the at least one error comprises at least one of:
    invalid credential information associated with the user and/or the software application, or
    invalid configuration information associated with a user and/or the software application.

20. The method of claim 13, wherein the indication causes the software application to cache the indication until the software application is loaded and/or displayed.

* * * * *